United States Patent
Moore

(10) Patent No.: US 11,121,414 B2
(45) Date of Patent: Sep. 14, 2021

(54) BATTERY ASSEMBLY WITH NEAR FIELD COMMUNICATION DEVICE

(71) Applicant: East Penn Manufacturing Co., Lyon Station, PA (US)

(72) Inventor: Stephen W. Moore, Fishers, IN (US)

(73) Assignee: East Penn Manufacturing Co., Lyon Station, PA (US)

(*) Notice: Subject to any disclaimer, the term of this patent is extended or adjusted under 35 U.S.C. 154(b) by 221 days.

(21) Appl. No.: 16/531,764

(22) Filed: Aug. 5, 2019

(65) Prior Publication Data

US 2021/0043986 A1     Feb. 11, 2021

(51) Int. Cl.
    *H01M 10/48*     (2006.01)
    *H01M 10/42*     (2006.01)
    *H04B 5/00*     (2006.01)

(52) U.S. Cl.
    CPC ......... *H01M 10/48* (2013.01); *H01M 10/425* (2013.01); *H04B 5/0031* (2013.01); *H01M 2010/4278* (2013.01)

(58) Field of Classification Search
    CPC ............... H01M 10/48; H01M 10/425; H01M 2010/4278
    See application file for complete search history.

(56) References Cited

U.S. PATENT DOCUMENTS

| | | |
|---|---|---|
| 8,237,403 B2 | 8/2012 | Ishii |
| 9,293,928 B2 | 3/2016 | Alexander et al. |
| 2016/0013827 A1* | 1/2016 | Hubinak ............... G06F 1/3206 455/558 |
| 2016/0105054 A1 | 4/2016 | Horito et al. |
| 2016/0247389 A1 | 8/2016 | Shimizu et al. |

FOREIGN PATENT DOCUMENTS

| | | |
|---|---|---|
| CN | 205564905 U | 9/2016 |
| DE | 102015007494 A1 | 1/2016 |
| DE | 102015202566 A1 | 8/2016 |
| JP | 2006252850 A | 9/2006 |

OTHER PUBLICATIONS

Abstract of CN205564905, dated Sep. 7, 2016, 1 page.
Abstract of WO2016128160, related to DE 102015202566, dated Aug. 18, 2016, 1 page.
Abstract of DE102015007494, dated Jan. 21, 2016, 1 page.
Abstract and English translation of JP 2006252850, dated Sep. 21, 2006, 14 pages.

* cited by examiner

*Primary Examiner* — Carlos Barcena
(74) *Attorney, Agent, or Firm* — Barley Snyder

(57) ABSTRACT

A battery assembly comprises a battery and a battery monitor. The battery has a cover, a post terminal, and a battery near field communication ("NFC") device. The battery NFC device is disposed within the cover adjacent the post terminal. The battery monitor is removably attachable to the post terminal and has a monitor NFC device communicating with the battery NFC device.

30 Claims, 5 Drawing Sheets

BATTERY ASSEMBLY WITH NEAR FIELD COMMUNICATION DEVICE

FIELD OF THE INVENTION

The present invention relates to a battery assembly and, more particularly, to a battery assembly having a near field communication device.

BACKGROUND

Known batteries, for example lead-acid batteries used in automobile and commercial trucking vehicle applications, are commonly warranties for a fixed period of time independent of usage. The batteries may have a battery monitor attached to a top post of the battery. The battery monitor includes a sensor used to monitor the state and load on the battery and is capable of reporting the monitored battery data to a driver or technician. The known battery monitor can only sense and report data from the battery to which it is connected. If the battery monitor is used with a different battery, for example if the battery monitor is moved to a different vehicle or the battery of the vehicle is replaced, the battery monitor will have continuously sensed and reported data from different batteries without distinction.

Different batteries used in different applications, for example, are capable of operating under different states of charge, have different life expectancies, and can handle different loads. Known battery monitors, however, are not calibrated to particular batteries and cannot compare the sensed data to the operating requirements of a particular battery. Furthermore, known battery monitors do not have access to and cannot report data of prior usage of the battery with a different battery monitor. Automobiles and trucks are increasingly outfitted with additional electrical components which increase a load on the battery. In light of these modern increased loads, known battery monitors cannot adequately sense or report an overall history of battery usage or usage in relation to the operating requirements of a particular battery type.

SUMMARY

A battery assembly according to the invention comprises a battery and a battery monitor. The battery has a cover, a post terminal, and a battery near field communication ("NFC") device. The battery NFC device is disposed within the cover adjacent the post terminal. The battery monitor is removably attachable to the post terminal and has a monitor NFC device communicating with the battery NFC device.

BRIEF DESCRIPTION OF THE DRAWINGS

The invention will now be described by way of example with reference to the accompanying figures, of which.

DETAILED DESCRIPTION OF THE EMBODIMENTS

The invention is explained in greater detail below with reference to embodiments of a battery assembly. This invention may, however, be embodied in many different forms and should not be construed as limited to the embodiments set forth herein; rather, these embodiments are provided so that this disclosure will be thorough and complete and still fully convey the scope of the invention to those skilled in the art.

A battery assembly according to the invention is shown in FIGS. 1-4. The battery assembly includes a battery 100 and a battery monitor 200 removably attached to the battery 100. The major components of the invention will now be described in greater detail.

Figure 1:
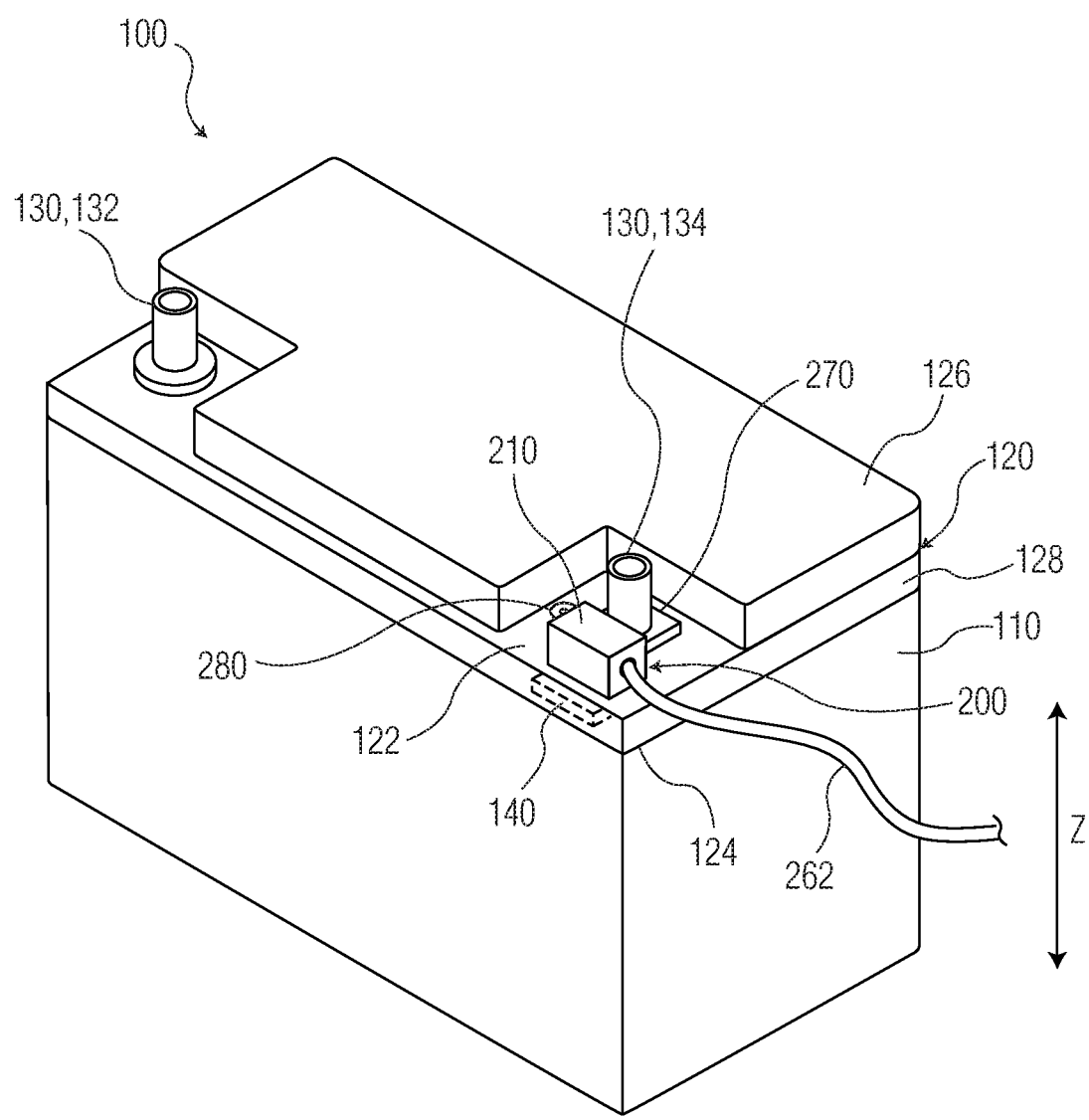
FIG. 1 is a perspective view of a battery assembly according to the invention.

The battery 100 is shown in FIG. 1. The battery 100 includes a housing 110, a cover 120 disposed on the housing 110, a pair of post terminals 130 extending through the cover 120, and a battery near field communication ("NFC") device 140 disposed in the cover 120 adjacent one of the post terminals 130.

The housing 110, as shown in FIG. 1, is formed in a cuboid shape and contains a plurality of battery cells (not shown) disposed in an interior of the housing 110. In an embodiment, the battery cells are lead-acid cells and the battery 100 is a lead-acid battery. In other embodiments, the battery 100 may be a lithium battery or a nickel metal hydride battery. One with ordinary skill in the art would understand that varying types of cells could be contained in the housing 110 to form other types of batteries 100.

The cover 120, as shown in FIG. 1, is attached to an upper side of the housing 110 and encloses the interior of the housing 110 containing the battery cells. The cover 120 has an upper surface 122 facing away from the housing 110 in a vertical direction Z and a lower surface 124 opposite the upper surface 122 facing the interior of the housing 110 in the vertical direction Z.

In the embodiment shown in FIG. 1, the cover 120 has an upper cover 126 and a lower cover 128. The lower cover 128 is directly attached to the housing 110 and the upper cover 126 is removably attached to the lower cover 128 to form the cover 120. In the shown embodiment, the upper cover 126 is disposed over less than an entire surface of the lower cover 128. In other embodiments, the upper cover 126 may cover an entirety of the lower cover 128. Further, in other embodiments, the cover 120 does not have the upper cover 126 and the lower cover 128 but is monolithically formed as a single member attached to the housing 110.

The post terminals 130, in the embodiment shown in FIG. 1, extend from an interior of the housing 110 and through the cover 120, protruding beyond the upper surface 122 of the cover 120 in the vertical direction Z. Each post terminal 130 extends though the cover 120 proximate a corner of the cover 120. In another embodiment, each of the post terminals 130 extends horizontally out from the interior of the housing 110. The post terminals 130 are formed of a conductive material, such as a metal, and are connected to the battery cells in the housing 110. The post terminals 130 include a positive post terminal 132 and a negative post terminal 134; power is transmitted from the battery 100 via electrical connection to the post terminals 130.

Figure 2:
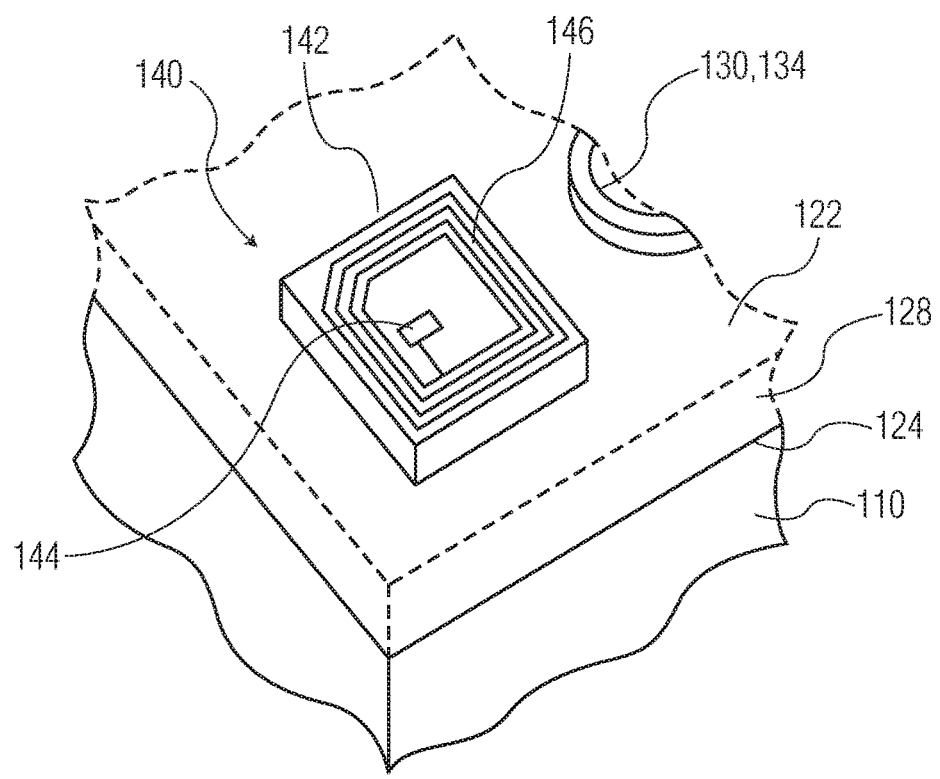
FIG. 2 is a detail perspective view of a battery NFC device of a battery of the battery assembly.

The battery NFC device 140, as shown in FIGS. 1 and 2, is embedded entirely within the cover 120 between the upper surface 122 and the lower surface 124 and is positioned adjacent one of the post terminals 130. The battery NFC device 140 is fixed within the cover 120 and, once embedded, is not removable from the cover 120. In the shown embodiment, the battery NFC device 140 is a passive NFC device.

Figure 4:
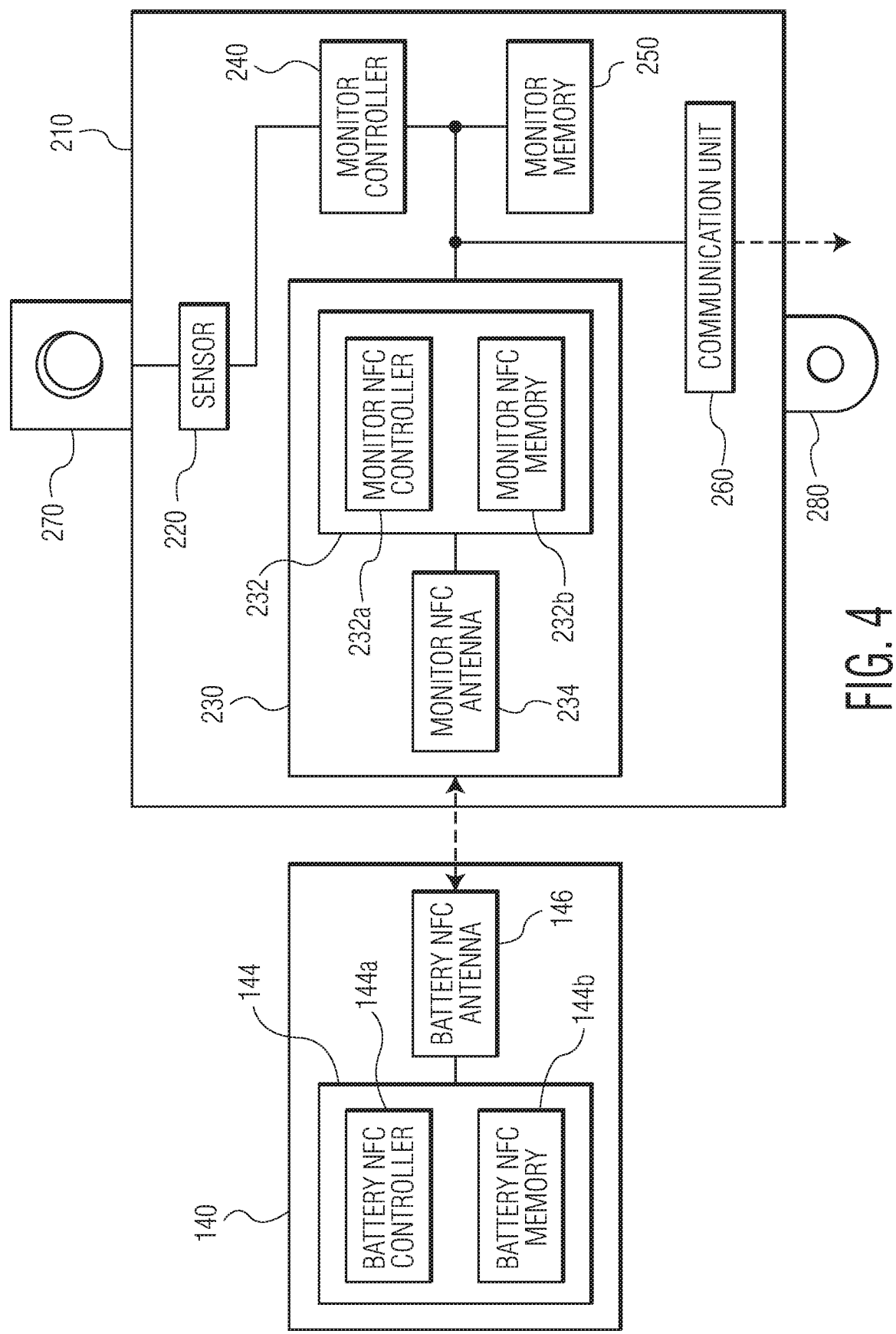
FIG. 4 is a schematic diagram of the battery NFC device and the battery monitor.

The battery NFC device 140, as shown in FIGS. 1, 2, and 4, includes a substrate 142, a battery NFC integrated chip 144, and a battery NFC antenna 146. The battery NFC integrated chip 144 and the battery NFC antenna 146 are disposed on the substrate 142 and connected to one another. The substrate 142 is formed from a plastic material and may be flexible or rigid.

The battery NFC integrated chip 144, as shown in FIG. 4, has a battery NFC controller 144a and a battery NFC memory 144b connected to the battery NFC controller 144a. The battery NFC memory 144b is a non-transitory computer readable medium such as electrically erasable programmable read-only memory ("EEPROM"). The battery NFC controller 144a may be any type of controller used in a passive NFC device known to those with ordinary skill in the art.

The battery NFC antenna 146, as shown in FIGS. 2 and 4, is formed of a conductive material, such as copper, aluminum, or silver, and is connected to the battery NFC integrated chip 144. The battery NFC antenna 146 transmits radio waves, based on signals sent from the battery NFC integrated chip 144, and receives radio waves. In an embodiment, the battery NFC antenna 146 transmits and receives radio waves at a frequency of 13.56 MHz.

Figure 3:
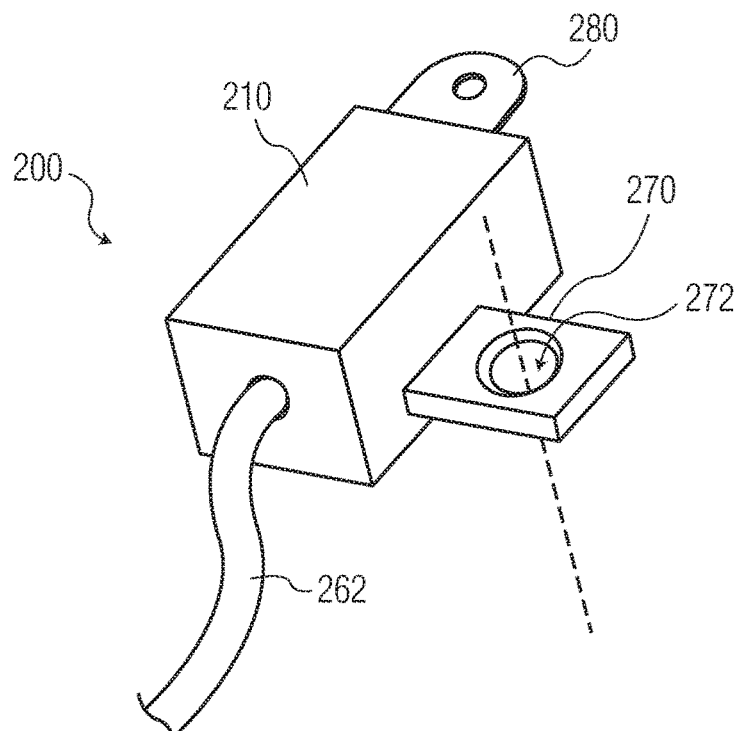
FIG. 3 is a perspective view of a battery monitor of the battery assembly.

The battery monitor 200 is shown in FIGS. 1 and 3. The battery monitor 200 includes a body 210 containing a sensor 220, a monitor NFC device 230, a monitor controller 240, a monitor memory 250, a communication unit 260, and a post mount 270 and an output connector 280 connected to the body 210.

The post mount 270 is formed of a conductive material, such as a metal, and extends as a rectangular tab from the body 210 as shown in FIG. 3. The post mount 270 defines a post terminal receiving passageway 272 extending through the post mount 270. The battery monitor 200 is removably attachable to either post terminal 130 by the post mount 270. In other embodiments, the post mount 270 may be formed in any shape capable of removably attaching to the post terminal 130 and forming an electrical connection with the post terminal 130.

The output connector 280 is formed of a conductive material, such as a metal, and extends as a tab from a different side of the body 210 than the post mount 270, as shown in FIGS. 1 and 3. The output connector 280 is removably attachable to an external device to which the battery 100 supplies power.

The body 210, as shown in FIGS. 1 and 3, is formed in a cuboid shape and, when attached to the post terminal 130, abuts the upper surface 122 of the cover 120. In other embodiments, the body 210 may be formed in any shape capable of containing the sensor 220, the monitor NFC device 230, the monitor controller 240, the monitor memory 250, and the communication unit 260 as described herein and capable of abutting the upper surface 122 of the cover 120.

As shown in FIG. 4, the monitor controller 240 is connected to the sensor 220, the monitor NFC device 230, the monitor memory 250, and the communication unit 260. The sensor 220 tracks time and measures voltage, current, and temperature. The sensor 220 transmits this data to the monitor controller 240, which records the data at the monitor memory 250. The monitor memory 250 may be any type of non-transitory computer readable medium known to those with ordinary skill in the art.

The monitor NFC device 230 is an active read-write NFC device controlled by the monitor controller 240 and, as shown in FIG. 4, includes a monitor NFC integrated chip 232 and a monitor NFC antenna 234. The monitor integrated chip 232, as shown in FIG. 4, has a monitor NFC controller 232a and a monitor NFC memory 232b connected to the monitor NFC controller 232a. The monitor NFC memory 232a is a non-transitory computer readable medium such as an EEPROM. The monitor NFC controller 232b may be any type of controller used in an active read-write NFC device known to those with ordinary skill in the art. The monitor NFC antenna 234, as shown in FIG. 4, is formed of a conductive material, such as copper, aluminum, or silver, and is connected to the monitor NFC integrated chip 232. The monitor NFC antenna 234 transmits radio waves, based on signals sent from the monitor NFC integrated chip 232, and receives radio waves. In an embodiment, the monitor NFC integrated chip 232 transmits and receives radio waves at a frequency of 13.56 MHz.

Communication unit 260, shown in FIG. 4, receives a signal from the monitor controller 240 and transmits the signal externally of the battery monitor 200. In an embodiment, the communication unit 260 uses a wired connection to transmit the signal via a cable 262. In an embodiment, the communication unit 260 transmits the signal as raw data to another processor external of the battery monitor 200 that is capable of translating the raw data. In another embodiment, the communication unit 260 is a known wireless transmitter transmitting the signal via text or email.

The usage of the battery 100 with the battery monitor 200 in a method for tracking battery data will now be described in greater detail with reference to FIGS. 1 and 4-7.

Figure 5:
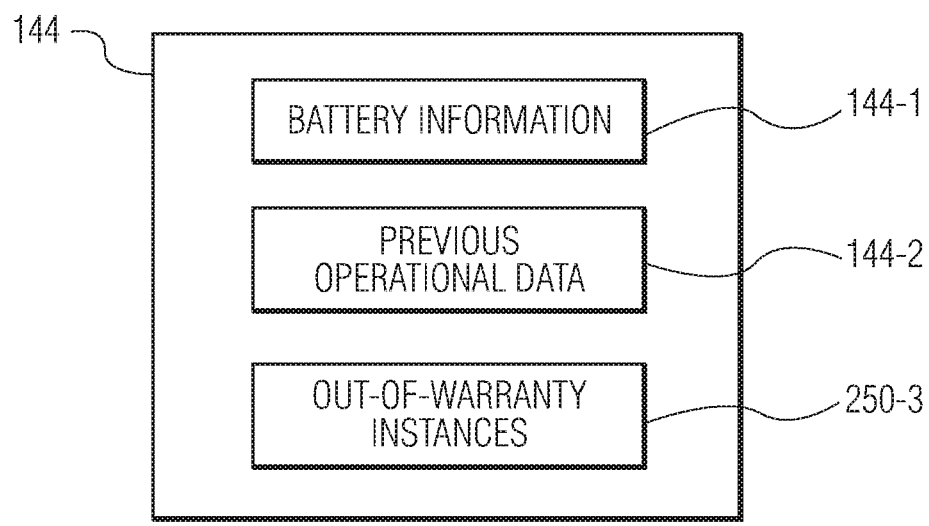
FIG. 5 is a schematic diagram of a battery NFC memory of the battery NFC device.
Figure 7:
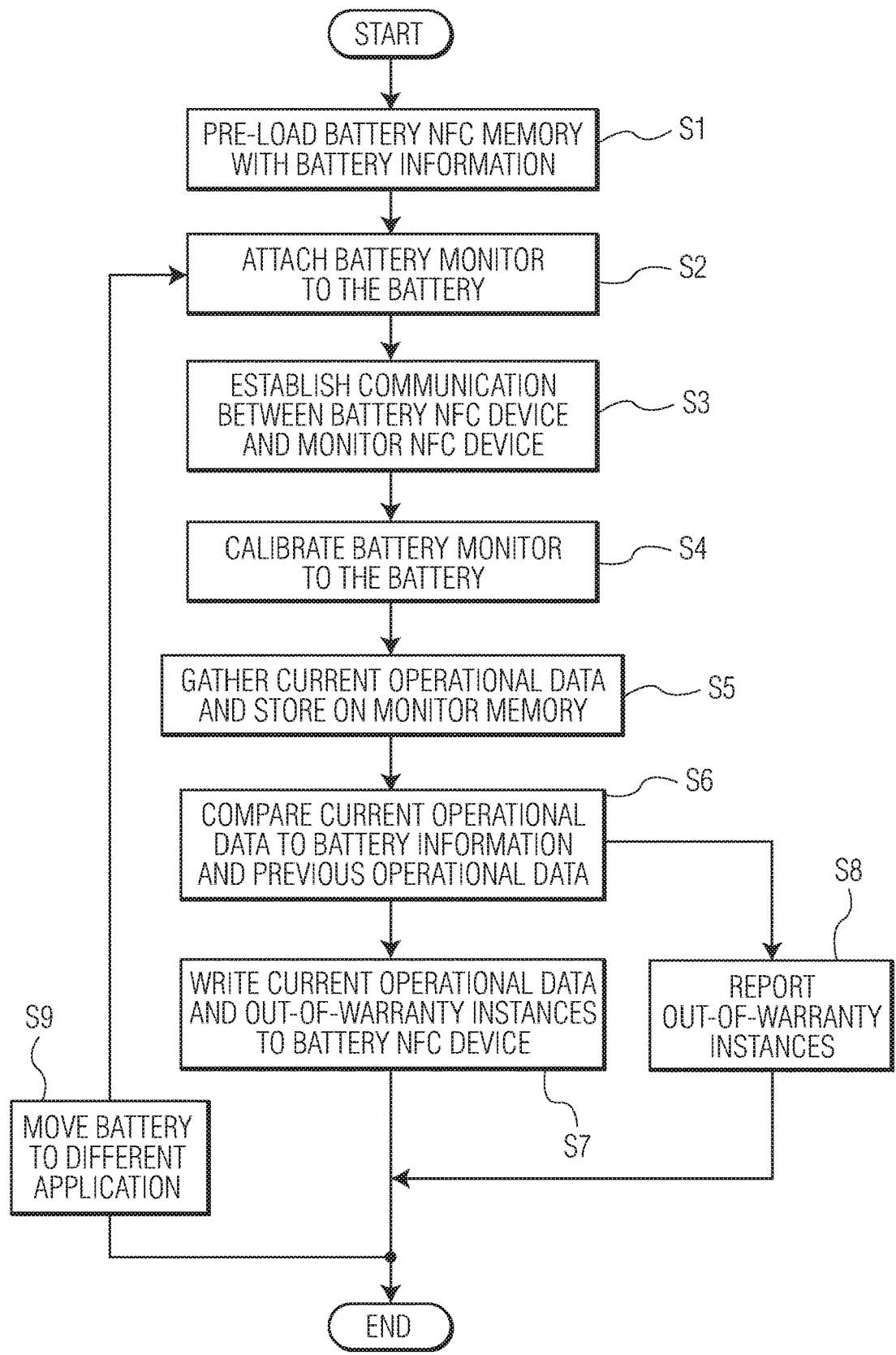
FIG. 7 is a schematic diagram of a method of tracking battery data using the battery assembly.

The battery NFC device 140 is embedded in the cover 120 of the battery 100 during manufacture and, in step S1 shown in FIG. 7 prior to use of the battery 100, the battery NFC memory 144b is pre-loaded with battery information 144-1 shown in FIG. 5 particular to the battery 100. In an embodiment, the battery information 144-1 pre-loaded on the battery NFC memory 144b includes at least one of a serial number, a manufacturing date, a manufacturing location, a model, and a product line of the battery 100. In other embodiments, any information descriptive of the battery 100 prior to use of the battery 100 may be pre-loaded as battery information 144-1 on the battery NFC memory 144b.

The battery information 144-1 pre-loaded on the battery NFC memory 144b also includes warranty conditions particular to the battery 100. The warranty conditions may include, for example, a threshold usage temperature, a threshold age, a threshold cumulative time used, a duration of voltage use outside of normal operating conditions, a threshold cumulative ampere-hour throughout, and a threshold cumulative watt-hour throughput; the listed warranty conditions are merely exemplary and any warranty conditions capable of being analyzed by the battery monitor 200 as described herein may be stored on the battery NFC memory 144b.

After the battery information 144-1 is pre-loaded on the battery NFC memory 144b, the battery 100 is moved to a first application, such as a first vehicle, and as shown in step S2 of FIG. 7 the battery monitor 200 of the first application is attached to the battery 100. The battery monitor 200 is removably attached to the battery 100; the post terminal 130 is positioned in the post terminal receiving passageway 272 and the battery monitor 200 is moved along the post terminal 130 in the vertical direction Z until the body 210 abuts the upper surface 122 of the cover 120, as shown in FIG. 1. The post mount 270 forms an electrical connection with the post terminal 130.

When the battery monitor 200 abuts the upper surface 122 of the cover 120, the monitor NFC device 230 is positioned in sufficiently close proximity to the battery NFC device 140 to establish communication between the NFC devices 140, 230 as shown in step S3 of FIG. 7. In an embodiment, the monitor NFC device 230 is positioned less than four inches from the battery NFC device 140 when the battery monitor 200 abuts the upper surface 122. The active monitor NFC device 230 generates a radio frequency ("RF") field based on a signal transmitted from the monitor NFC controller 232 to the monitor NFC antenna 234. The monitor NFC antenna 234 creates the RF field and, when in close proximity, the battery NFC antenna 146 detects the RF field and uses the RF field to power the battery NFC integrated chip 144.

The battery monitor 200 is then calibrated to the battery 100 as shown in step S4 of FIG. 7. With the battery NFC integrated chip 144 powered and the battery NFC antenna 146 communicating with the monitor NFC antenna 234, the monitor controller 240 controls the monitor NFC device 230 to transmit a signal to the battery NFC integrated chip 144 requesting battery information 144-1 stored on the battery NFC memory 144b and any previous operational data 144-2 stored on the battery NFC memory 144b, as shown in FIG. 5 and described in greater detail below. The battery NFC controller 144a retrieves the battery information 144-1 and any previous operational data 144-2 from the battery NFC memory 144b and transmits the battery information 144-1 and previous operational data 144-2 through the battery NFC antenna 146 to the monitor NFC device 230. The monitor NFC device 230 receives the battery information 144-1 and previous operational data 144-2 and transmits both to the monitor controller 240, which stores the battery information 144-1 and previous operational data 144-2 on the monitor memory 250 as shown in FIG. 6.

During operation of the battery 100 in the first application, the battery monitor 200 gathers and stores current operational data 250-1 as shown in step S5 of FIG. 7. In operation, a current of the battery 100 flows through the post mount 270, through the sensor 220, and to the output connector 280 to power the external device connected to the output connector 280. The sensor 220 is electrically connected to the post terminal 130 via the post mount 270, measures voltage, current, and temperature of the battery 100 and transmits this data to the monitor controller 240. The monitor controller 240 processes the voltage, current, and temperature of the battery 100 with time data to calculate current operational data 250-1 including, for example, usage temperature, time used, voltage usage, ampere-hour throughput, watt-hour throughput, and internal impedance; the current operational data 250-1 may include any data that the monitor controller 240 can process from voltage, current, and temperature data. The monitor controller 240 stores the current operational data 250-1 on the monitor memory 250 as shown in FIG. 6.

Figure 6:
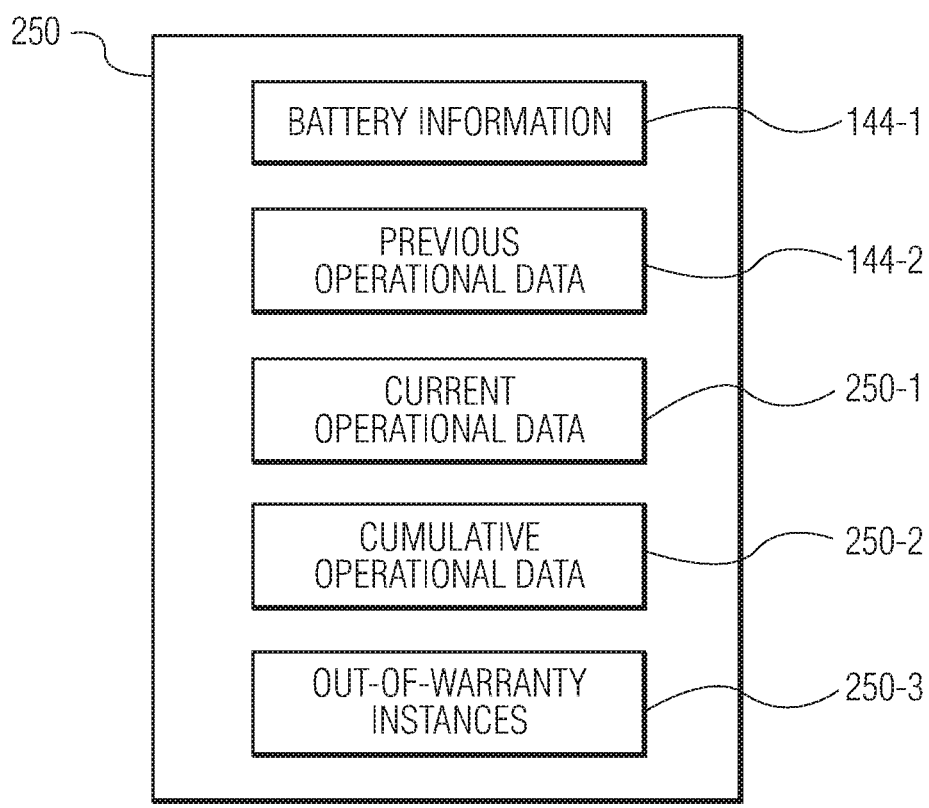
FIG. 6 is a schematic diagram of a monitor memory of the battery monitor.

In step S6 shown in FIG. 7, the monitor controller 240 compares the current operational data 250-1 stored on the monitor memory 250 to the battery information 144-1 and the previous operational data 144-2 stored on the monitor memory 250 as shown in FIG. 6. The monitor controller 240 calculates cumulative operational data 250-2 from the previous operational data 144-2 and the current operational data 250-1, for example, calculating cumulative time used from previous time used and current time used and calculating cumulative ampere-hour throughout from previous ampere-hour throughput and current ampere-hour throughput. The monitor controller 240 stores the cumulative operational data 250-2 on the monitor memory 250.

The monitor controller 240 compares the cumulative operational data 250-2 to the battery information 144-1 including the warranty conditions. The monitor controller 240, for example, compares the warranty condition of a threshold time used to the cumulative time used and compares the warranty condition of a threshold cumulative ampere-hour throughput to the determined cumulative ampere-hour throughput. As would be understood by one with ordinary skill in the art, the monitor controller 240 may calculate cumulative operational data 250-2 for any of the operational data described herein and may compare the cumulative operational data 250-2 to any corresponding warranty condition. Alternatively, as would be understood by one with ordinary skill in the art, if no previous operational data 144-2 is stored on the battery NFC memory 144b, the cumulative operational data 250-2 is equivalent to the current operational data 250-1.

The monitor controller 240 determines an out-of-warranty instance 250-3 for each cumulative operational data 250-2 exceeding the corresponding threshold warranty condition and stores the out-of-warranty instances 250-3 at the monitor memory 250 as shown in FIG. 6. In step S7 shown in FIG. 7, the monitor controller 240 controls the monitor NFC device 230 to periodically transmit the cumulative operational data 250-2 and the out-of-warranty instances 250-3 stored on the monitor memory 250 to the battery NFC device 140, the battery NFC controller 144a writing the received cumulative operational data 250-2 and out-of-warranty instances 250-3 to the battery NFC memory 144b. The cumulative operational data 250-2 becomes previous operational data 144-2 shown in FIG. 5 when written to the battery NFC memory 144b.

Concurrently with the writing of the out-of-warranty instances 250-3 to the battery NFC memory 144b or at any time during operation of the battery monitor 200, as shown in step S8 of FIG. 7, the monitor controller 240 reports the determined out-of-warranty instances 250-3 via the communication unit 260. The communication unit 260 can transmit the out-of-warranty instances 250-3 via the cable 262 to, for example, a driver of the first vehicle. In another embodiment, the communication unit 260 transmits the out-of-warranty instances 250-3 as raw data to another processor. Alternatively, if the communication unit 260 is a wireless transmitter, the communication unit 260 transmits the out-of-warranty instances 250-3 wirelessly such as by text or email to, for example, the driver or a service center of the first vehicle, indicating that a change of the battery 100 is required.

The battery 100, as shown in step S9 of FIG. 7, may be removed from the first application and used in a second application having a second battery monitor 200, such as by being moved to a second vehicle, without losing the previous operational data 144-2 or the out-of-warranty instances 250-3. The process of steps S2-S8 repeats each time the battery 100 is moved to a different application in step S9; the battery monitor 200 is attached to the battery 100, the battery monitor 200 is calibrated to the battery 100 by receiving the battery information 144-1 and previous operational data 144-2 from the battery NFC device 140, and the battery monitor 200 gathers, writes, and reports current operational data 250-1 and out-of-warranty instances 250-3. One with ordinary skill in the art would understand that the same procedure would apply for moving the battery 100 to a third application, a fourth application, and so on. Previous operational data 144-2 and out-of-warranty instances 250-3 are continuously tracked for the battery 100 through all applications.

Likewise, the battery monitor 200 can be used with multiple batteries 100; attachment of the battery monitor 200 to a second battery 100 repeats the process of steps S2-S8. When the battery monitor 200 is calibrated to the second battery 100, all cumulative operational data 250-2 stored on the monitor memory 250 related to the first battery 100 is erased.

What is claimed is:

1. A battery assembly, comprising:
   a battery having a cover, a post terminal, and a battery NFC device disposed within the cover adjacent the post terminal; and
   a battery monitor removably attachable to the post terminal and having a monitor NFC device communicating with the battery NFC device.

2. The battery assembly of claim 1, wherein the battery NFC device is a passive NFC device.

3. The battery assembly of claim 2, wherein the monitor NFC device is an active read-write NFC device.

4. The battery assembly of claim 1, wherein the battery NFC device has a battery NFC memory storing a plurality of battery information.

5. The battery assembly of claim 4, wherein the battery information includes at least one of a serial number, a manufacturing date, a manufacturing location, a model, and a product line of the battery.

6. The battery assembly of claim 5, wherein the battery information includes a plurality of warranty conditions.

7. The battery assembly of claim 6, wherein the battery NFC memory stores a plurality of previous operational data and a plurality of out-of-warranty instances of the battery.

8. The battery assembly of claim 7, wherein the battery monitor has a post mount removably attachable to the post terminal and a sensor connected to the post mount.

9. The battery assembly of claim 8, wherein the battery monitor has a monitor memory storing a plurality of current operational data of the battery based on a plurality of data gathered by the sensor.

10. The battery assembly of claim 9, wherein the monitor memory stores the battery information and the previous operational data.

11. The battery assembly of claim 10, wherein the battery monitor has a communication unit capable of transmitting wirelessly.

12. The battery assembly of claim 11, wherein the battery monitor has a monitor controller connected to the sensor, the monitor NFC device, the monitor memory, and the communication unit.

13. A method for tracking battery data, comprising:
    providing a battery having a cover, a post terminal, and a battery NFC device disposed within the cover;
    pre-loading a battery NFC memory of the battery NFC device with a plurality of battery information;
    attaching a battery monitor to the post terminal, the battery monitor having a monitor NFC device communicating with the battery NFC device; and
    calibrating the battery monitor to the battery by transmitting the battery information from the battery NFC device to the monitor NFC device.

14. The method of claim 13, wherein the battery information includes at least one of a serial number, a manufacturing date, a manufacturing location, a model, and a product line of the battery.

15. The method of claim 13, wherein the battery information includes a plurality of warranty conditions.

16. The method of claim 15, further comprising writing a plurality of out-of-warranty instances and a plurality of current operational data to the battery NFC memory.

17. The method of claim 16, further comprising gathering the current operational data of the battery using a sensor of the battery monitor.

18. The method of claim 17, further comprising comparing the current operational data to the battery information with a monitor controller of the battery monitor.

19. The method of claim 18, wherein the comparing step includes determining the out-of-warranty instances based on a comparison of the current operational data with the warranty conditions.

20. The method of claim 16, further comprising reporting the out-of-warranty instances from the battery monitor by a wired connection or a wireless transmission.

21. The method of claim 16, wherein the battery NFC memory stores a plurality of previous operational data of the battery.

22. The method of claim 21, wherein, in the calibrating step, the previous operational data is transmitted from the battery NFC device to the monitor NFC device.

23. The method of claim 22, further comprising comparing the current operational data to the battery information and the previous operational data with a monitor controller of the battery monitor.

24. The method of claim 23, wherein the comparing step includes calculating a plurality of cumulative operational data based on the previous operational data and the current operational data.

25. The method of claim 24, wherein the comparing step includes determining the out-of-warranty instances based on a comparison of the cumulative operational data with the warranty conditions.

26. The method of claim 25, further comprising writing the cumulative operational data to the battery NFC memory.

27. The method of claim 26, further comprising removing the battery monitor from the post terminal and attaching a second battery monitor to the post terminal.

28. The method of claim 27, wherein the cumulative operational data becomes previous operational data when written to the battery NFC memory and the second battery monitor performs at least one of the calibrating, gathering, comparing, writing, and reporting steps.

29. The method of claim 26, further comprising removing the battery monitor from the post terminal and attaching the battery monitor to a post terminal of a second battery.

30. The method of claim 29, wherein the cumulative operational data related to the battery and stored on a monitor memory of the battery monitor is erased and the battery monitor performs at least one of the calibrating, gathering, comparing, writing, and reporting steps for the second battery.

* * * * *